United States Patent
Patel et al.

(10) Patent No.: US 9,902,217 B2
(45) Date of Patent: Feb. 27, 2018

(54) SYSTEM AND METHOD FOR MANAGING TIRE PRESSURE FOR A TRAILER

(71) Applicant: FORD GLOBAL TECHNOLOGIES, LLC, Dearborn, MI (US)

(72) Inventors: Dilip B. Patel, Novi, MI (US); Christopher Henderson, Belleville, MI (US); Eric L. Reed, Livonia, MI (US); Dante K. Crockett, Detroit, MI (US); Greg Swadling, Millford, MI (US); James Edwin Blatchford, Northville, MI (US); Stavros Dionyssopoulos, Gross Ile, MI (US); Nimish H. Patel, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/811,433

(22) Filed: Jul. 28, 2015

(65) Prior Publication Data
US 2017/0028796 A1    Feb. 2, 2017

(51) Int. Cl.
G08B 21/00    (2006.01)
B60C 23/04    (2006.01)
B60C 23/00    (2006.01)

(52) U.S. Cl.
CPC ........ B60C 23/0408 (2013.01); B60C 23/009 (2013.01); B60C 23/0471 (2013.01)

(58) Field of Classification Search
CPC .......................... B60C 23/009; B60C 23/0408
USPC .................................................. 340/431, 477
See application file for complete search history.

(56) References Cited

U.S. PATENT DOCUMENTS

| | | | |
|---|---|---|---|
| 5,488,352 A * | 1/1996 | Jasper | H01R 13/6633 280/423.1 |
| 7,463,139 B2 | 12/2008 | Burlak et al. | |
| 8,013,759 B1 | 9/2011 | Aid et al. | |
| 8,068,019 B2 | 11/2011 | Bennie et al. | |
| 8,098,145 B2 | 1/2012 | Ancuta et al. | |
| 2001/0002813 A1 | 6/2001 | Seki et al. | |
| 2003/0090085 A1 | 5/2003 | Seksaria et al. | |
| 2005/0093683 A1 | 5/2005 | Wee et al. | |
| 2008/0297337 A1 * | 12/2008 | Marguet | B60C 23/0433 340/447 |

(Continued)

FOREIGN PATENT DOCUMENTS

JP          H06-199192 A    7/1994
WO    WO 2014/037540 A1    3/2014

*Primary Examiner* — Ojiako Nwugo
(74) *Attorney, Agent, or Firm* — Jones Robb, PLLC; Raymond Coppiellie

(57) ABSTRACT

The present disclosure provides a system and method for managing tire pressure for a trailer. A controller may be configured to manage communications between a vehicle and a trailer. A tire pressure management system module to be mounted on the trailer may be operatively connected to the controller by a tow connector. The tire pressure management system module may be configured to receive tire pressure information from at least one sensor operatively associated with at least one tire of the trailer, and transmit messages to the controller based on the tire pressure information, wherein the controller triggers a notification when at least one of the messages indicates a tire pressure that fails to meet a criteria.

21 Claims, 3 Drawing Sheets

(56) References Cited

U.S. PATENT DOCUMENTS

| | | | |
|---|---|---|---|
| 2009/0179747 A1* | 7/2009 | Lin | B60C 23/0416 |
| | | | 340/442 |
| 2010/0271189 A1 | 10/2010 | Miller et al. | |
| 2012/0105222 A1 | 5/2012 | Miller et al. | |
| 2013/0193669 A1 | 8/2013 | Glazner | |
| 2013/0307679 A1* | 11/2013 | Tran | B60G 17/0165 |
| | | | 340/442 |
| 2014/0236420 A1 | 8/2014 | Bromback et al. | |
| 2015/0202932 A1* | 7/2015 | Kessler | B60C 23/04 |
| | | | 340/445 |
| 2016/0207367 A1 | 7/2016 | Zula et al. | |
| 2016/0366336 A1* | 12/2016 | Kuehnle | H04N 5/23238 |

* cited by examiner

SYSTEM AND METHOD FOR MANAGING TIRE PRESSURE FOR A TRAILER

RELATED APPLICATION

This application is related to U.S. patent application Ser. No. 14/811,374, filed Jul. 28, 2015 (now U.S. Pat. No. 9,757,944), the entire content of which is incorporated by reference herein.

TECHNICAL FIELD

The present disclosure relates generally to a method and system for managing tire pressure for a trailer and to a vehicle for carrying out the method of the disclosure.

INTRODUCTION

Tire pressure management systems (TPMS) have become increasingly prevalent in modern vehicles. However, TPMS systems that manage a trailer, or some other wheeled structure attached to a vehicle, may face unique complexities. For example, sensors may be located at each wheel of the trailer and may further leverage wireless transmission (e.g., RF transmissions) in order to communicate with a TPMS module. When such a module is located on the vehicle, the transmissions may encounter interference, signal degradation, and other communication issues. Accordingly, a design that mitigates against the communication issues presented by a trailer configuration will enhance the effectiveness of a TPMS system.

SUMMARY

In accordance with various exemplary embodiments, the present disclosure provides a system and method for managing tire pressure for a trailer. A controller may be configured to manage communications between a vehicle and a trailer. A tire pressure management system module to be mounted on the trailer may be operatively connected to the controller by a tow connector. The tire pressure management system module may be configured to receive tire pressure information from at least one sensor operatively associated with at least one tire of the trailer, and transmit messages to the controller based on the tire pressure information, wherein the controller triggers a notification when at least one of the messages indicates a tire pressure that fails to meet a criteria.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
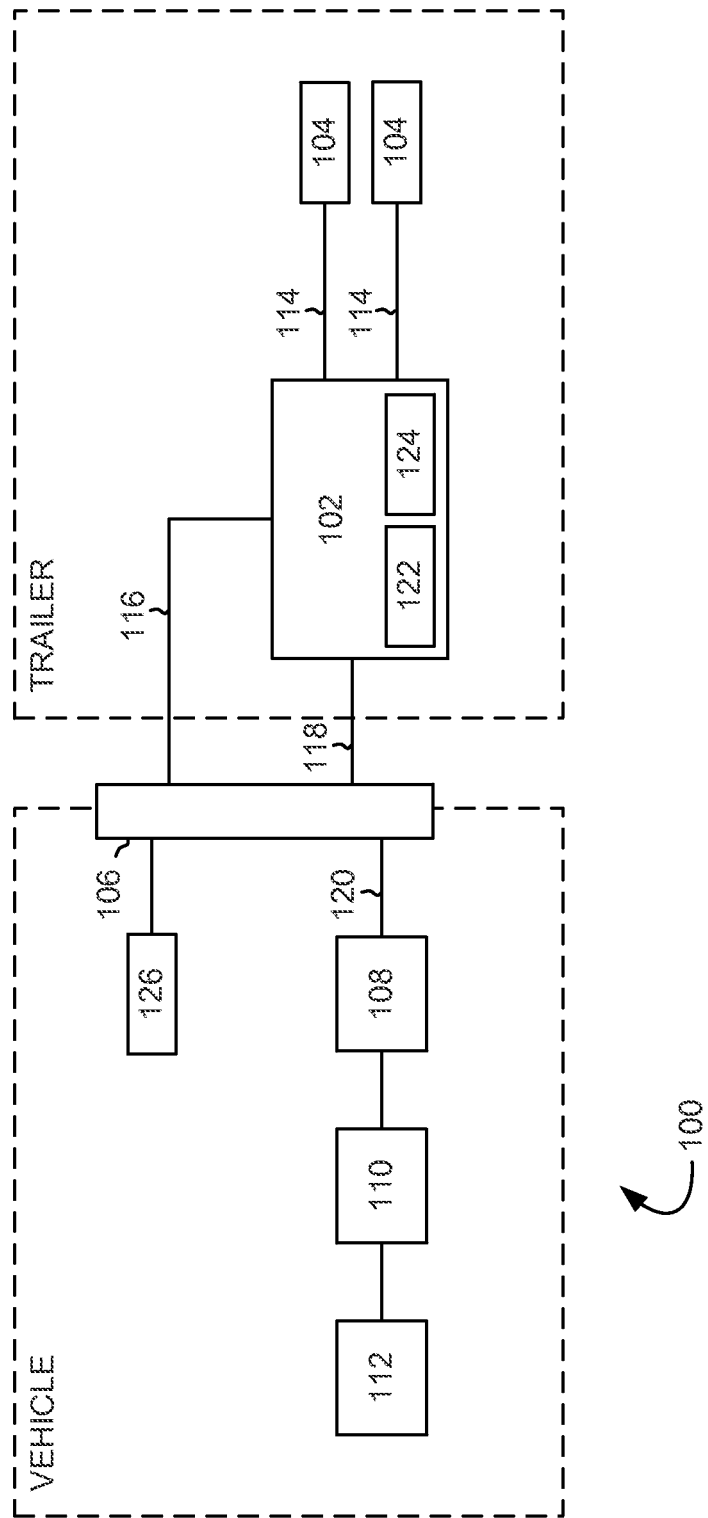
FIG. 1 is a schematic illustration of an system for managing tire pressure for a trailer in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The disclosure provides a method and system for managing tire pressure for a trailer. In accordance with the present teachings, an exemplary embodiment may include a vehicle that comprises a controller to be used in a vehicle and a trailer that comprises a tire pressure management system (TPMS) module to be used in a trailer.

The controller may comprise a synchronous data link control (SDLC) controller that manages data communication on a vehicle network. For example, the vehicle network may implement controller area network (CAN) protocol, a local interconnect network (LIN) protocol, or may be any other suitable vehicle network. Data may be communicated between various vehicle network devices in the form of messages (e.g., CAN messages) over the vehicle bus.

The TPMS module may comprise a computing device to be mounted on the trailer that communicates with a plurality of tire sensors associated with tires of the trailer. For example, each sensor may comprise identifying information, such as a sensor ID, stored at the TPMS module. The sensors may sense a tire pressure for the tires of the trailer and transmit this information to the TPMS module. As will be understood by those of skill in the art, the TPMS module may be retrofitted to existing trailers or sold as part of the infrastructure of new trailers.

In accordance with the present teachings, in an exemplary embodiment the TPMS module may transmit one or more messages (e.g., CAN messages) to the controller indicating the tire pressure for each tire mounted (or rotatably connected) to the trailer. For example, the TPMS module and controller may be operatively connected via a tow connector that links the vehicle to the trailer. The controller may route the messages to one or more vehicle computing devices, and based on the messages, a notification may be triggered when the tire pressure for at least one of the trailer tires does not meet a tire pressure criteria.

The described TPMS configuration may provide a number of advantages over traditional architectures. For example, the TPMS module may be mounted on the trailer itself, and the trailer may accordingly store sensor IDs for each of the tire pressure sensors. Further, the TPMS module may communicate with the vehicle using a wired connection via the tow connector, and may also implement a robust messaging protocol (e.g., CAN, LIN, or any other suitable protocol). This configuration may provide greater reliability when multiple trailers and vehicles are connected to one another. Because the sensor IDs are stored at the TPMS module on the trailer, the trailer may be switched between vehicles with minimal vehicle and/or trailer specific configuration required. In addition, use of the messaging protocol and/or wired communication medium may enable greater security for communications between the vehicle and the TPMS module.

In exemplary embodiments, this greater security may also include enabling the TPMS module to be located in a secure location on the trailer. Because exemplary embodiments utilize wired, rather than wireless, transmissions between the vehicle and trailer, it may not be necessary to ensure the module is located at a location conducive to wireless communication with the vehicle (e.g., controller of the vehicle). This enables greater flexibility for module location, and ultimately allows the module to be stored in a more secure location, such as an enclosed location inaccessible to an unknown individual near the trailer. Further, a location conducive to wireless signal reception from the one or more sensors that transmit sensed tire pressure to the TPMS module may be selected based on the greater flexibility.

FIG. 1 depicts a vehicle and trailer that may be placed in communication with one another using the method and system of the present disclosure. In accordance with the present teachings, in an exemplary embodiment a trailer may be any wheeled structure that comprises an axle and may include two, four, six, or any other suitable number of wheels. The system 100 may include TPMS module 102, located in/on the trailer, and sensors 104 associated with wheels of the trailer. TPMS module 102 may be a computing device including software for communicating with sensors 104 via wireless transmissions and communicating with controller 108 of a vehicle (to be connected to the trailer) using messages formatted according to a network protocol (e.g., CAN, LIN, or any other suitable protocol). TPMS module 102 also may include an antenna 122 capable of receiving and/or transmitting RF transmissions and a network port 124 capable of transmitting messages over a wired transmission medium. In an exemplary embodiment, sensors 104 may sense tire pressure for the tires mounted (rotatably connected) to the trailer and transmit the tire pressure information to TPMS module 102 over wireless communication links 114.

A tow connector 106 may connect the vehicle to the trailer. For example, tow connector 106 may comprise a plurality of connector pins and/or electrical connection points (not shown) that operatively couple the vehicle to the trailer. At the vehicle, tow connector 106 may connect to a power source 126 and vehicle network bus 120. At the trailer, tow connector 106 may connect to TPMS module 102 such that module 102 receives power from the vehicle over a power link 116 and is communicatively coupled to vehicle network bus 120 over a communication link 118.

The vehicle may include a controller 108, a body control module (BCM) 110, an instrument panel cluster (IPC) 112, and a vehicle network bus 120. Controller 108 may comprise an SDLC controller that manages communications over vehicle network bus 120. For example, vehicle network bus 120 may communicatively connect vehicle computing devices such that data may be exchanged between these devices. Vehicle network bus 120 may implement a protocol, such as CAN, LIN, or any other suitable protocol. BCM 110 may manage various electronic accessories of the vehicle, including power windows, air conditioning, central locking, vibration of vehicle instruments, and other suitable electronic accessory systems. IPC 112 may comprise an instrument panel that displays various vehicular information to a user of the vehicle, such as vehicle speed, gas quantity, warning indicators, emergency indicators, and any other suitable information. IPC 112 may include analog instruments and digital displays.

In exemplary embodiments, one of more of BCM 110 and IPC 112 may be used to communicate an indicator and/or warning to a user of the vehicle based on the tire pressure of the tires of a trailer attached to the vehicle. For example, an indicator may be displayed on a digital display or an indicator light be triggered at IPC 112. In another example, the BCM 110 may trigger a haptic warning, such as a vibration of the steering wheel, or may trigger any other suitable indicator and/or warning.

TPMS module 102, controller 108, BCM 110, and IPC 112 may form one part of the hardware of a control system, and may be one or more microprocessor based devices that include a central processing unit (CPU) for processing incoming signals from known source(s). These computing devices may be provided with volatile memory units, such as a RAM and/or ROM that function along with associated input and output buses, and may also be optionally configured as an application specific integrated circuit, or may be formed through other logic devices that are well known to the skilled in the art. The computing devices either may be formed as a portion of an existing electronic control unit, or may be configured as a stand-alone entity.

In accordance with the present teachings, in an exemplary embodiment TPMS module 102 may be configured such that sensors 104 may communicate with module 102 to relay tire pressure information. For example, TPMS module 102 may be trained such that identifying information for each of sensors 104 is stored at the module. Moreover, TPMS module 102 may receive a pressure criteria (e.g., target tire pressure) for each tire associated with each of sensors 104. In an exemplary embodiment, a user may interact with IPS 112 or any other suitable data input hardware of the vehicle to provide data input to the TPMS module 102.

In accordance with the present teachings, in an exemplary embodiment TPMS module 102 may receive tire pressure information from learned sensors 104 over, for example, wireless communication links 114. TPMS module 102 may then send one or more messages (e.g., CAN messages) that indicate the tire pressure for sensors 104 over communication link 118. In an embodiment, communication link may comprise a wired communication link. The one or more messages may be routed over vehicle communication bus 120 to controller 108. Based on the messages and the indicated tire pressures, controller 108 may trigger a notification and/or warning to a user of the vehicle. The notification and/or warning may include an indicator displayed on IPC 112 and/or an indicator triggered by BCM 110.

Figure 2:
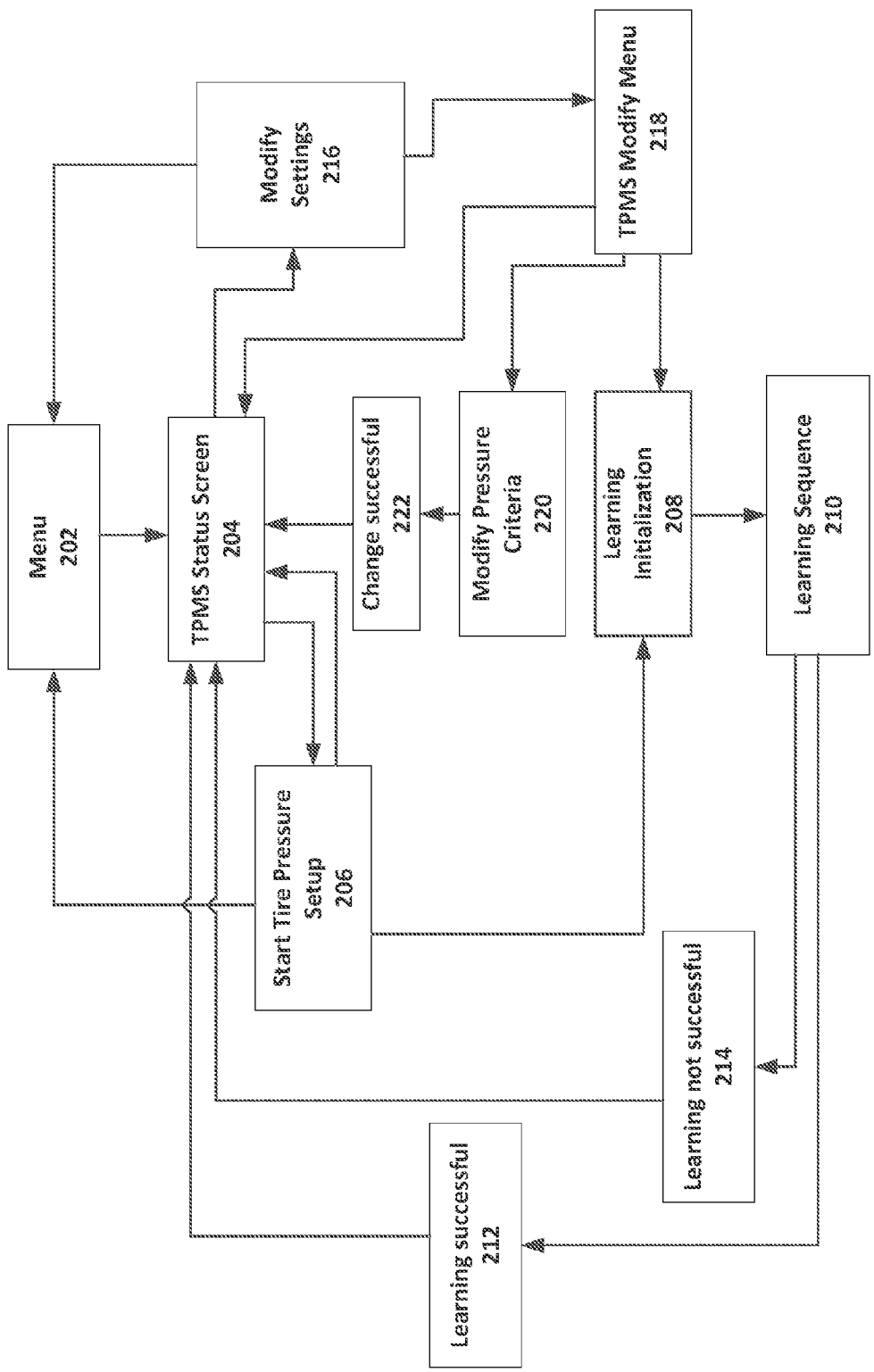
FIG. 2 is a flowchart for configuring a TPMS module in accordance with the present teachings.

FIG. 2 illustrates a flowchart for configuring a TPMS module in accordance with an exemplary embodiment of the disclosure. In accordance with the present teachings, an exemplary embodiment of the method begins with a vehicle menu screen at step 202. For example, a display of the vehicle (e.g., IPS 112 or any other hardware with a display screen) may display a menu screen for interacting with a plurality systems of the vehicle. From the menu screen, the user may select the tire pressure management system and move to step 204. At step 204, the tire pressure management status screen may be displayed to the user. The status screen may display the connection status of TPMS module 102 (e.g., whether connection with the module is detected), a number of tires for the trailer, a detection status for each sensor associated with each tire, a pressure status for each tire associated with each sensor, a target tire pressure for each tire, and any other suitable status information. In an exemplary embodiment, a connected trailer may be not be configured for tire pressure management, and therefore the user may trigger a learning process. For instance, TPMS module 102 may not have identifying information stored for each of sensors 104, one of sensors 104 or an associated tire may have been replaced, or for any other suitable consideration, a learning process may be started for TPMS module 102.

At step 206, the tire pressure setup may be started. For example, one or more checks may be performed to determine whether learning may be initialized. One exemplary check includes detecting a speed for the vehicle. In an exemplary embodiment, learning may not be initialized unless the vehicle is in stationary position. If the checks are performed satisfactorily, learning may be initialized at step 208. The initialization may comprise a series of steps, such as pinging TPMS module 102 and/or sensors 104, initializing TPMS module 102 for storage of configuration information, and any other suitable initialization steps. Once initialized, the learning sequence may be performed at step 210.

In accordance with the present teachings, in an exemplary embodiment, the learning sequence may include a sequence of steps taken by the user to configure TPMS module 102. For instance, the user may be prompted to enter a number of tires for the trailer, and the user may respond by entering a number of tires. In an alternative embodiment, a number of sensors 104 may be detected by TPMS module 102, and the user may be asked to confirm a number of tires based on the number of sensors 104 detected. The sequence may then cycle through each of the sensors 104 associated with each of the number of tires, prompting the user to enter information pertaining to each tire. The information may include the location of the tire (e.g., front left, front right, back left, back right, etc.) and a pressure criteria for the tire (e.g., target tire pressure). In addition, each sensor 104 may be configured to transmit identifying information for the sensor (e.g., sensor ID) to the TPMS module 102, and the module may store in memory the identifying information, location of the associated tire, and pressure criteria for the tire. This process may be repeated for each of sensor 104 associated with each of the number of tires until the learning for all the tires is complete. In another exemplary embodiment, the pressure criteria (e.g., target tire pressure) for one or more tires may be provided by TPMS module 102. For example, TPMS module 102 may provide a tire pressure sensed by sensors 104 for one or more tires of the trailer. The sensed tire pressure may be displayed to the user, and the user may confirm or adjust the displayed tire pressure to set the tire pressure criteria.

If the learning is completed without incident, a success indicator may be displayed to the user at step 212. If an error occurs during learning, such as a mismatch between an input number of tires and detected sensors 104, a lack of signal or signal strength for a wireless signal from one of sensors 104, an abort input received from the user, or for any other suitable error, an unsuccessful indicator may be displayed to the user at step 214. In either case, the process may progress back to display the TPMS status screen at step 204.

In accordance with the present teachings, in an exemplary embodiment, a modification may be made to a configured TPMS module 102. For instance, from TPMS status screen, the user may select an option to modify current TPMS settings for the trailer. The process may progress to a modify settings screen at step 216. At step 216, the TPMS modification may be started. For example, one or more checks may be performed to determine whether modification may be performed. One exemplary check includes detecting a speed for the vehicle. In an exemplary embodiment, modification may not be performed unless the vehicle is in stationary position. If the checks are performed satisfactorily, the process may progress to a modification menu screen at step 218.

At step 218, the user may be prompted to enter the desired modification. For example, the user may desire to modify a pressure criteria for one of the tires of the trailer or the user may desire to trigger a relearning sequence, for instance if one of sensors 104 and/or an associated tire has been replaced. In another example, the user may trigger a relearning sequence to modify the pressure criteria for a plurality of tires (e.g., all of the tires) of the trailer. If the user selects a relearning sequence, the process may progress to step 208, and a learning sequence may be triggered, as described herein. In accordance with the present teachings, in an exemplary embodiment updated identifying information may be learned for at least one sensor associated with a tire (e.g., a newly installed sensor). In this example, the previously stored identifying information for the tire may be overwritten with the updated identifying information during the learning process.

In another exemplary embodiment, a learning of new sensors 104 and/or a detection of missing or replacement sensors 104 may be performed automatically. For example, TPMS module 102 may detect the presence of an unknown sensor based on, for example, an unknown sensor ID. The detection may trigger a learning process, as described herein, or may trigger an automatic learning process. In an automatic learning process, the unknown sensor ID may overwrite a previously known sensor ID that is no longer detected by TPMS module 102, and the data associated with the previously known sensor may be associated with the newly detected sensor (e.g., tire location, pressure criteria, transmission schedule, and the like). In an exemplary embodiment, the newly detected sensor may replace the previously known sensor based on a confidence criteria. For example, the confidence criteria may comprise a received signal level (e.g., received signal strength) from the newly detected sensor, a formatting for the sensor ID transmitted by the newly detected sensor, a transmission period for the newly detected sensor, or any other suitable criteria. The replacement may be performed when the newly detected sensors passes the confidence criteria. In an exemplary embodiment, the automatic detection and/or learning may be triggered during operation of the vehicle.

If the user selects modification of a pressure criteria, the process may progress to step 220. At step 220, a modify pressure criteria screen may be displayed, where the user is prompted to select the tire for modification and input the new pressure criteria. In response, the user may make the selection and input the new pressure criteria. Based on the input, TPMS module 102 may store the inputted pressure criteria in association with the selected tire and the associated sensor ID for the selected tire. If the storage is successful, the process may move to step 222 where a change successful indication may be displayed to the user. The process may then return to the TPMS status screen at step

204. Accordingly, based on the flowchart illustrated in FIG. 2, TPMS module 102 may be configured to monitor the tire pressure of tires mounted (rotatably connected) to a trailer.

In accordance with the present teachings, in an exemplary embodiment the configuration process of FIG. 2 may enable TPMS module 102 plug and play functionality. For example, once TPMS module 102 is configured (e.g., via the method of FIG. 2) the module (and associated trailer) may be connected (via a tow connector) to a plurality of different vehicles, where the vehicles include a controller similar to controller 108. The controller of the vehicles may sense a configured TPMS module 102 via the connector, and accordingly may implement a method for managing tire pressure for the trailer in accordance with embodiments described herein. For example, the controller of the vehicle may utilize the configuration information stored at TPMS module 102 (such as sensor information, tire pressure criteria, tire location, and any other suitable information) in order to perform the tire pressure management method.

Figure 3:
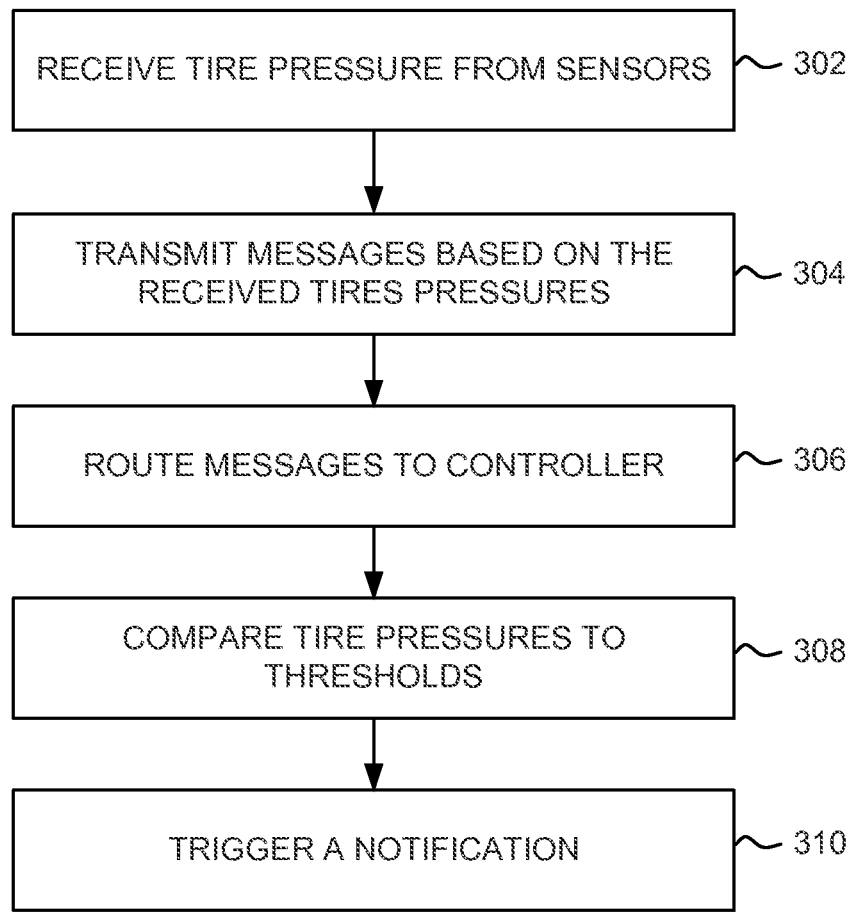
FIG. 3 is a flowchart of an exemplary method for managing tire pressure for a trailer in accordance with the present teachings.

FIG. 3 illustrates a flowchart for managing tire pressure for a trailer in accordance with an exemplary embodiment of the disclosure. For example, as illustrated in FIG. 1, a trailer may be connected to a vehicle, and a TPMS system may manage the tire pressures for the trailer's tires.

In accordance with the present teachings, an exemplary embodiment of the method begins at step 302, where tire pressure information may be received from a plurality of sensors. For example, TPMS module 102 may receive tire pressure information for tires associated with each of sensors 104. In an embodiment, TPMS module 102 may have been previously configured to manage tire pressure for the tires mounted (rotatably connected) to the trailer. For example, the method of FIG. 2 may be used to configure TPMS module 102 prior to the performance of the method of FIG. 3. In an exemplary embodiment, TPMS module 102 may receive tire pressure information from at least one of sensors 104.

In accordance with the present teachings, in an exemplary embodiment the tire pressure information received from each of sensors 104 may comprise a sensed tire pressure (e.g., sensed pounds per square inch, PSI) for each tire associated with each sensor. Sensors 104 may communicate with TPMS module 102 using wireless communication links 114. In an example, the sensors may transmit tire pressure information based on a period (e.g., every 5 minutes, 10 minutes, 15 minutes, 30 minutes, hour, and the like), based on a number of revolutions, or based on any other suitable transmission schedule. In another example, sensors 104 may transmit tire pressure information based on a sensed pressure change value (e.g., a sensed pressure change value beyond a threshold). A significant sensed pressure change may indicate a problem with the system, and it may be beneficial to transmit pressure information based on this pressure change prior to a default scheduled transmission so that a timely notification can be triggered.

At step 304, one or more messages may be transmitted based on the received tire pressure information. For example, TPMS module 102 may transmit one or more messages over communication link 118 that indicate the sensed tire pressure for each of the tires associated with sensors 104. TPMS module 102 may be operatively connected to vehicle communication bus 120 via tow connector 106. Messages may be formatted in accordance with a protocol implemented by the vehicle communication bus 120 (e.g., CAN, LIN, and the like). In accordance with the present teachings, in an exemplary embodiment, TPMS module 102 is powered by a power source 126 located on the vehicle via tow connector 106 and power link 116.

At step 306, the one or more messages may be routed to controller 108 of the vehicle. For example, the messages may be transmitted from TPMS module 102 to vehicle network bus 120 via tow connector 106, and vehicle network bus 120 may route the messages to controller 108. In accordance with the present teachings, in an exemplary embodiment, each message may indicate tire pressure for one tire, and the message may further include identifying information for the tire and/or sensor 104 associated with the tire pressure indicated in the message. In another embodiment, the tires pressures may be indicated in any number of messages (including a single message) and each tire pressure indication may further include identifying information for the tire and/or sensor 104 associated with the indicated tire pressure.

In accordance with the present teachings, in an exemplary embodiment, controller 108, or some other device connected to vehicle network bus 120, may include a security filter, such as a firewall. The security filter may be configured to deny reception of particular messages, such as message determined to be potentially harmful to the systems of the vehicle. In another embodiment, the security filter may be configured to permit particular messages, such as CAN and/or LIN messages, messages that indicate tire pressures for tires, messages from TPMS module 102 (or some other known computing device), or any combination of these. In these embodiments, based on TPMS module 102 being located on the trailer and the security filter protection of network vehicle bus 120, the vehicle may be further protected from electronic attacks.

At step 308, the tire pressures for the trailer tires may be compared to tire pressure criteria for each of the tires. For example, the tire pressures indicated in the one or more messages may be compared to a tire pressure criteria for each tire. The tire pressure criteria may comprise a target tire pressure (e.g., target PSI level) and may be stored at controller 108 and/or retrieved from TPMS module 102. In other examples, the pressure criteria and/or tire pressure for the trailer tires may be sensed, stored, and/or processed in any suitable unit of pressure (e.g., PSI, kPa, Bar, and the like).

In accordance with the present teachings, in an exemplary embodiment, the tire pressure criteria each may be associated with a particular tire and/or sensor 104. Based on identifying information in the received one or more messages, the tire pressure for a particular tire and/or sensor 104 may be compared to the pressure criteria for that particular tire and/or sensor 104.

At step 308, a notification and/or warning may be triggered based on the comparisons. For example, TPMS module 102 may instruct one or more of BCM 110 and IPC 120 to trigger a notification and/or warning. In accordance with the present teachings, in an exemplary embodiment the notification and/or warning may be triggered when the comparison reveals that the indicated tire pressure for a particular tire and/or sensor 104 based on the one or more received messages is a threshold value different from the tire pressure criteria for that particular tire and/or sensor 104. The threshold may be any suitable pressure value (e.g., 2, 5, 7, 10, or any other suitable pressure unit value). In another exemplary embodiment, the notification and/or warning may be triggered when the comparison reveals a threshold percentage difference between the indicated tire pressure for a particular tire and/or sensor 104 and the tire pressure criteria for that particular tire and/or sensor 104. The threshold percentage may be any suitable value (e.g., 5%, 10%, 15%, 20%, 25%, 30%, or any other suitable percentage).

In exemplary embodiments, one of more of BCM 110 and IPC 112 may be used to communicate an indicator and/or warning to a user of the vehicle based on the tire pressure of the trailer tires. For example, an indicator may be displayed on a digital display or an indicator light may be triggered at IPC 112. In another example, the BCM 110 may trigger a haptic warning, such as a vibration of the steering wheel, or may trigger any other suitable indicator and/or warning. In an embodiment, when the comparison reveals that the difference between the indicated tire pressure based on the received messages and the tire pressure criteria for a particular tire and/or sensor 104 is greater than or equal to a first threshold, a first indicator may be triggered, and when the comparison reveals that the difference is greater than or equal to a second threshold, then a second indicator may be triggered. The first threshold may be lesser in value than the second threshold. In an embodiment, an indicator or warning may comprise denying an operator the ability to drive the vehicle, for example, when the tire pressure for one or more trailer tires is determined to be unsafe. Various embodiments may implement other notifications and/or warnings without deviating from the scope of the disclosure.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A system for managing tire pressure for a trailer, the system comprising:
a controller configured to manage communications between a vehicle and a trailer; and
a tire pressure management system module to be mounted on the trailer, the module being operatively connected to the controller by a tow connector, wherein the module is configured to:
receive tire pressure information from at least one sensor operatively associated with at least one tire of the trailer; and
transmit messages to the controller based on the tire pressure information, the controller being configured to trigger a notification when at least one of the messages indicates a tire pressure that fails to meet a criteria, wherein information communicated between the tire pressure management module and the controller is secured using a firewall that permits messages of a predetermined format.

2. The system of claim 1, wherein one or more of the messages comprise controller area network messages.

3. The system of claim 1, wherein the tire pressure management module is powered by the vehicle via the tow connector.

4. The system of claim 1, wherein the tire pressure sensor is configured to transmit the tire pressure information to the module over RF transmissions.

5. The system of claim 4, wherein the tire pressure management module is further configured to:
store identifying information about the at least one tire pressure sensor such that the tire pressure information received from the sensor is associated with a particular tire of the trailer.

6. The system of claim 1, wherein the tire pressure management module is located at a secure location on the trailer.

7. The system of claim 1, wherein the predetermined format comprises controller area network.

8. A method for managing tire pressure for a trailer, the method comprising:
receiving, at tire pressure management system module mounted on the trailer, tire pressure information from at least one sensor associated with a tire rotatably connected to the trailer;
transmitting controller area network messages to a controller mounted on a vehicle based on the tire pressure information, wherein the module is operatively connected to the controller by a tow connector;
securing the information communicated between the tire pressure management module and the controller using a firewall such that controller area network messages comprising tire pressure information are permitted; and triggering a notification when at least one of the messages indicates a tire pressure that fails to meet a criteria.

9. The method of claim 8, further comprising powering the tire pressure management module by the vehicle via the tow connector.

10. The method of claim 8, further comprising transmitting the tire pressure information from at least one sensor to the module via RF transmissions.

11. The method of claim 10, further comprising:
storing identifying information about the at least one sensor at the module such that the tire pressure information received from the at least one sensor is associated with a particular tire of the trailer.

12. The method of claim 8, wherein the tire pressure management module is located at a secure location on the trailer.

13. A method for configuring a tire pressure management system module, comprising:
receiving, at tire pressure management system module mounted on a trailer, input comprising a number of tires;
learning, by the tire pressure management module, identifying information for each sensor associated with each tire, each sensor being configured to sense tire pressure for a tire rotatably connected to the trailer; and
transmitting controller area network messages to a controller mounted on a vehicle based on the tire pressure information received from the learned sensors, wherein information communicated between the tire pressure management module and the controller is secured using a firewall that permits messages of a predetermined format and wherein the controller triggers a notification when at least one of the messages indicates a tire pressure that fails to meet a criteria.

14. The method of claim 13, wherein the learning identifying information for each sensor associated with each tire further comprises learning a tire location for each learned sensor.

15. The method of claim 13, further comprising:
receiving a pressure criteria for each of the tires; and
storing, at the module, each received pressure criteria, wherein a notification is triggered when at least one of the messages indicates a tire pressure for one of the tires that fails to meet the received pressure criteria for the tire.

16. The method of claim 15, further comprising:
receiving a modified pressure criteria for at least one tire; and
overwriting the previously stored pressure criteria for the tire with the modified pressure criteria.

17. The method of claim 13, wherein the learning identifying information for each sensor associated with each tire further comprises storing, at the module, the identifying information for the sensors.

18. The method of claim 17, further comprising:
learning updated identifying information for at least one sensor associated with a tire; and
overwriting previously stored identifying information for the tire with the updated identifying information.

19. A method for managing tire pressure for a trailer, comprising:
receiving, at a firewall, messages sent from a trailer-mounted tire pressure management system module to a vehicle controller, the messages relating to trailer tire pressure;
selectively permitting, through the firewall, received messages of a predetermined format; and
triggering a notification when at least one of the received messages indicates a tire pressure that fails to meet a criteria.

20. The method of claim 19, wherein the predetermined format comprises controller area network messages.

21. The method of claim 19, wherein the module is operatively connected to the controller by a tow connector.

* * * * *